US012356265B2

United States Patent
Viering et al.

(10) Patent No.: US 12,356,265 B2
(45) Date of Patent: Jul. 8, 2025

(54) VARIABLE TIME-TO-TRIGGER VALUE FOR TRANSMISSION OF MEASUREMENT REPORT FOR WIRELESS NETWORKS

(71) Applicant: NOKIA TECHNOLOGIES OY, Espoo (FI)

(72) Inventors: Ingo Viering, Munich (DE); Ahmad Awada, Munich (DE); Umur Karabulut, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 431 days.

(21) Appl. No.: 17/922,476

(22) PCT Filed: May 5, 2020

(86) PCT No.: PCT/EP2020/062414
§ 371 (c)(1),
(2) Date: Oct. 31, 2022

(87) PCT Pub. No.: WO2021/223851
PCT Pub. Date: Nov. 11, 2021

(65) Prior Publication Data
US 2023/0199590 A1 Jun. 22, 2023

(51) Int. Cl.
*H04W 36/00* (2009.01)
*H04W 36/08* (2009.01)

(52) U.S. Cl.
CPC ... *H04W 36/0088* (2013.01); *H04W 36/0058* (2018.08); *H04W 36/00837* (2018.08); *H04W 36/0085* (2018.08); *H04W 36/087* (2023.05)

(58) Field of Classification Search
None
See application file for complete search history.

(56) References Cited

U.S. PATENT DOCUMENTS

2008/0220784 A1 9/2008 Somasundaram et al.
2012/0289233 A1* 11/2012 Medbo .................. G01S 11/10
455/436

(Continued)

FOREIGN PATENT DOCUMENTS

WO WO-2014165603 A1 * 10/2014 ............... H04B 1/38

OTHER PUBLICATIONS

International Search Report and Written Opinion dated Jan. 21, 2021 corresponding to International Patent Application No. PCT/EP2020/062414.

*Primary Examiner* — Jay L Vogel
(74) *Attorney, Agent, or Firm* — Robert P. Michal, Esq.; Carter, DeLuca & Farrell LLP

(57) ABSTRACT

A method may include detecting, by the user device, a cell identity of a neighbor cell, determining, by the user device, whether either a first measurement by the user device of a signal from the neighbor cell after the detecting or a measurement by the user device of a signal from the neighbor cell within a threshold period of time after the detecting, at least fulfills an entry condition of a measurement reporting event for the neighbor cell, transmitting, by the user device, a measurement report based on the second time-to-trigger value if either the first measurement of a signal from the neighbor cell after the detecting or a measurement of a signal from the neighbor cell within a threshold period of time after the detecting fulfills the entry condition of the measurement reporting event, otherwise, transmitting, by the user device, a measurement report based on the first time-to-trigger value.

1 Claim, 12 Drawing Sheets

(56) References Cited

U.S. PATENT DOCUMENTS

| | | | |
|---|---|---|---|
| 2013/0303231 A1 | 11/2013 | Yiu et al. | |
| 2015/0181495 A1* | 6/2015 | Matin | H04W 72/20 |
| | | | 370/332 |
| 2015/0373596 A1* | 12/2015 | Yiu | H04L 47/12 |
| | | | 370/332 |
| 2017/0055187 A1* | 2/2017 | Kang | H04W 36/0058 |
| 2017/0339594 A1* | 11/2017 | Park | H04W 24/10 |

\* cited by examiner

VARIABLE TIME-TO-TRIGGER VALUE FOR TRANSMISSION OF MEASUREMENT REPORT FOR WIRELESS NETWORKS

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node B (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a method may include determining, by a user device, a first time-to-trigger value and a second time-to-trigger value, wherein the second time-to-trigger value is shorter than the first time-to-trigger value; detecting, by the user device, a cell identity of a neighbor cell; determining, by the user device, whether either a first measurement by the user device of a signal from the neighbor cell after the detecting or a measurement by the user device of a signal from the neighbor cell within a threshold period of time after the detecting, at least fulfills an entry condition of a measurement reporting event for the neighbor cell; transmitting, by the user device, a measurement report based on the second time-to-trigger value if either the first measurement of a signal from the neighbor cell after the detecting or a measurement of a signal from the neighbor cell within a threshold period of time after the detecting fulfills the entry condition of the measurement reporting event; and otherwise, transmitting, by the user device, a measurement report based on the first time-to-trigger value.

According to another example embodiment, a method may include determining, by a user device, a first time-to-trigger value and a second time-to-trigger value, wherein the second time-to-trigger value is shorter than the first time-to-trigger value; determining, by the user device, if a measurement of a signal from the neighbor cell results in an entry condition of a measurement reporting event for the neighbor cell being over-fulfilled by at least a threshold amount; transmitting, by the user device, a measurement report based on the second time-to-trigger value if the measurement of the signal from the neighbor cell results in the entry condition of the measurement reporting event for the neighbor cell being over-fulfilled by at least the threshold amount for a period of time that is greater than or equal to the second time-to-trigger value; and otherwise, transmitting, by the user device, a measurement report based on the first time-to-trigger value.

According to another example embodiment, a method may include sending, by a network node to a user device, configuration information indicating at least one of a first time-to-trigger value and a second time-to-trigger value, wherein the second time-to-trigger value is shorter than the first time-to-trigger value; receiving, by the network node from the user device, a measurement report based on the second time-to-trigger value if either: 1) a first measurement of a signal received by the user device from a neighbor cell after a detecting by the user device of a cell identity of the neighbor cell fulfills an entry condition of the measurement reporting event, or 2) a measurement of a signal from the neighbor cell, within a threshold period of time after the detecting of the cell identity, at least fulfills the entry condition of the measurement reporting event; and otherwise, receiving, by the network node from the user device, a measurement report based on the first time-to-trigger value.

According to another example embodiment, a method may include sending, by a network node to a user device, configuration information indicating at least one of a first time-to-trigger value and a second time-to-trigger value, wherein the second time-to-trigger value is shorter than the first time-to-trigger value; receiving, by the network node from the user device, a measurement report based on the second time-to-trigger value if a measurement of a signal by the user device from the neighbor cell results in an entry condition of a measurement reporting event for the neighbor cell being over-fulfilled by at least a threshold amount; and otherwise, receiving, by the network node from the user device, a measurement report based on the first time-to-trigger value.

Other example embodiments are provided or described for various described example methods, including: means for performing any of the example methods; a non-transitory computer-readable storage medium comprising instructions stored thereon that, when executed by at least one processor, are configured to cause a computing system to perform any of the example methods; and an apparatus including at least one processor, and at least one memory including computer program code, the at least one memory and the computer program code configured to, with the at least one processor, cause the apparatus at least to perform any of the example methods.

The details of one or more examples of embodiments are set forth in the accompanying drawings and the description below. Other features will be apparent from the description and drawings, and from the claims.

DETAILED DESCRIPTION

Figure 1:
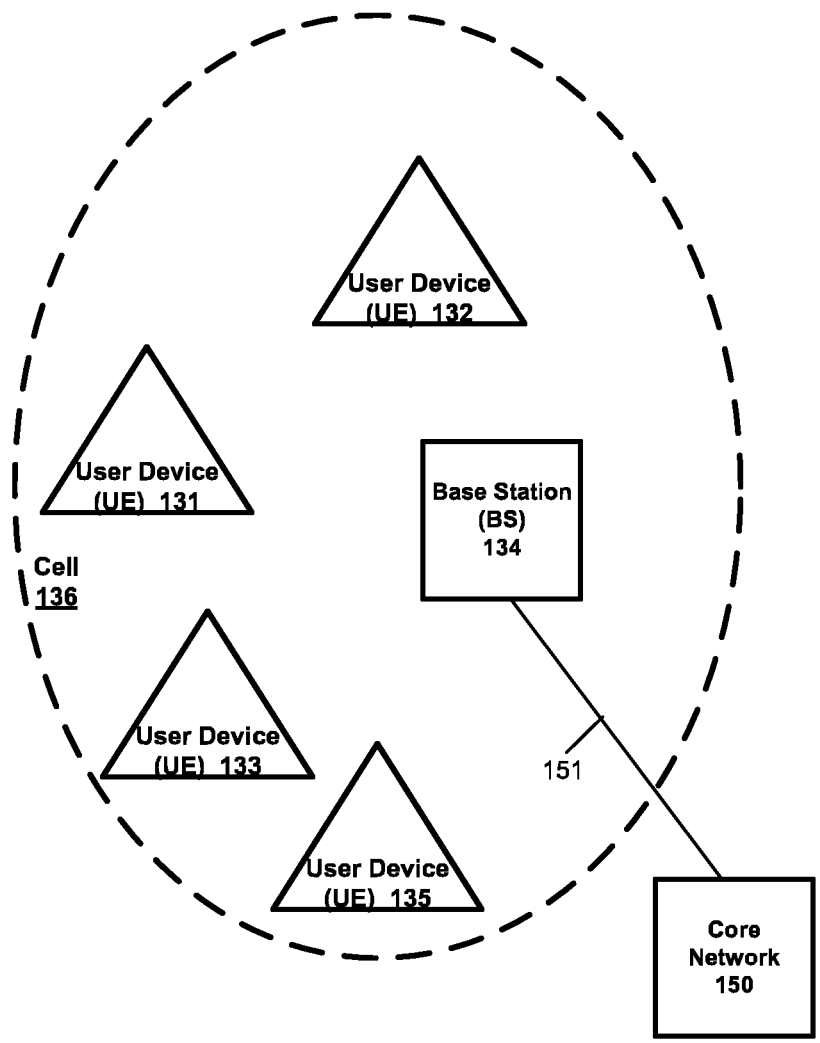
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a BS, next generation Node B (gNB), a next generation enhanced Node B (ng-eNB), or a network node. The terms user device and user equipment (UE) may be used interchangeably. A BS may also include or may be referred to as a RAN (radio access network) node, and may include a portion of a BS or a portion of a RAN node (e.g., such as a centralized unit (CU) and/or a distributed unit (DU) in the case of a split BS). At least part of the functionalities of a BS (e.g., access point (AP), base station (BS) or (e) Node B (eNB), BS, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface or NG interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a centralized unit (CU) and/or a distributed unit (DU) in the case of a split BS or split gNB), or other network node.

According to an illustrative example, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node (e.g., BS, eNB, gNB, CU/DU, . . . ) may forward data to the UE that is received from a network or the core network, and/or forward data received from the UE to the network or core network. RAN nodes (e.g., BS, eNB, gNB, CU/DU, . . . ) may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform. A base station may also be DU (Distributed Unit) part of IAB (Integrated Access and Backhaul) node (a.k.a. a relay node). DU facilitates the access link connection(s) for an IAB node.

A user device (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. A user device may be also MT (Mobile Termination) part of IAB (Integrated Access and Backhaul) node (a.k.a. a relay node). MT facilitates the backhaul connection for an IAB node.

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network.

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)—related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to a eMBB UE (or an eMBB application running on a UE).

The various example embodiments may be applied to a wide variety of wireless technologies or wireless networks, such as 5G (New Radio (NR)), LTE, LTE-A, cmWave, and/or mmWave band networks, IoT, MTC, eMTC, eMBB, URLLC, NR sidelink communications, etc., or any other wireless network or wireless technology. These example networks, technologies or data service types are provided only as illustrative examples.

In an example embodiment, a UE may perform cell search. Cell search may include functions and/or procedures by which a UE finds new cells. Cell search may be carried out, for example, when a device is initially entering the coverage area of a system. Also, to enable mobility (e.g., allowing a UE to perform handover from a source/serving cell to a target cell), cell search may also be performed by a UE, e.g., periodically or continuously by UEs that may be moving within a network or system. Cell search may include the UE scanning a frequency band, and then decoding primary synchronization signals (PSS) and secondary synchronization signals (SSS) of a synchronization signal block (SSB) transmitted by a cell. The UE may determine timing information (e.g., frame timing and/or symbol timing), and may determine (or detect) a cell identity of the cell (e.g., the UE may determine a physical cell identity (PCI) of the cell) based on PSS and SSS. Each cell is assigned a PCI, in order to identify the cell. Cell detection (the UE detecting a cell identity or PCI) of a cell may be performed by a UE, as part of cell search, to determine a PCI for the cell, e.g., based on PSS and SSS transmitted by the cell. Thus, a UE detecting a cell (or performing cell detection) may include the UE detecting or determining a PCI for a cell, e.g., based on PSS and SSS signals received from the cell. After obtaining timing information (and possibly other system information) and the PCI for a cell, the UE may begin measuring signals (e.g., measuring a reference signal received power (RSRP), or other signal measurement, of reference signals) received by the UE from the recently detected cell.

A UE (or user device) within a NR/5G network, or other network, may be configured by the network or serving cell to perform measurements and report them in accordance with a measurement configuration. For example, a UE may receive from a serving cell a measurement configuration that instructs the UE to measure a signal quantity of reference signals, such as measure a reference signal received power (RSRP) or other signal quantity of a channel state information-reference signal (CSI-RS) or synchronization signal block (SSB) signals. The UE, at least under certain conditions, may (or will) send a measurement report(s) to the serving cell based on the signal measurements of signals received from the serving cell and/or from one or more neighbor (non-serving) cells. The measurement report may be based on (and/or may include) signal measurements for one or more neighbor or non-serving cells (e.g., in some cases, where the UE may have recently detected the cell identity or PCI of the cell based on cell search). The measurement configuration may indicate, for example, the reporting criterion, e.g., periodical reporting, or event triggered reporting based on a signal measurement fulfilling one or more measurement reporting events, and indicate the signals to be measured (e.g., CSI-RS and/or SSB/PBCH). The measurement configuration may also indicate one or more neighbor (or non-serving) cells to be measured and/or reported. The measurement configuration may also indicate one or more measurements to be performed (or signal quantities to be measured) and/or reported for cells, such as, e.g., a reference signal received power (RSRP), a reference signal received quality (RSRQ), a signal to interference-plus-noise (SINR) ratio, or other signal measurement.

In an example embodiment, a UE may perform signal measurements (e.g., measure RSRP of CSI-RS or SSB signals received from a cell) of signals received from the serving (or source) cell (e.g., for one or more beams for each cell), and/or one or more neighbor (or non-serving) cells. In some cases, these signal measurements may be filtered, e.g., averaged, over time before determining whether the signal measurement fulfills a measurement reporting event. In an example embodiment, a transmission of a measurement report may be triggered (or caused) based fulfillment of on one or more measurement reporting events. There may be one or more measurement reporting events that may trigger a transmission by the UE of a measurement report to the network node (e.g., BS, gNB, eNB, . . . ). For example, measurement reporting events may include the following, as examples: Event A1 (serving cell becomes better than a threshold), event A2 (serving cell becomes worse than a threshold); event A3 (neighbor cell becomes offset better than serving/source cell); event A4 (neighbor cell becomes better than a threshold), etc. These are some example measurement reporting events, and others may be used. In some cases, a measurement report received by a serving cell from a UE may be used by the network (or serving/primary network node or BS/gNB) to initiate or cause the UE to perform a handover to a neighbor cell that fulfills an entry condition and caused the transmission of the measurement report.

For example, an A3 measurement reporting event may be triggered when a signal measurement (which may be after filtering or averaging of the signal over a period of time has been performed by the UE) of a neighbor cell fulfills an entry condition of the A3 measurement reporting event for a (continuous) time period of at least a time-to-trigger (TTT). Equation 1 (Eq. 1) shows an entry condition of a very simple example A3 measurement reporting event, where Mn is the signal (e.g., CSI-RS, or SSB/PBCH) measurement of the neighbor cell, Mp is the signal measurement of the serving (or primary) cell, and Off is an offset. The equation for the entry condition for an A3 measurement reporting event may be different, and/or may include other offsets or hysteresis values, a cell specific offset, etc. A3 is an example measurement reporting event, and other measurement reporting events may be used. Eq. 1 below describes a very simple A3 measurement reporting event.

$$Mn>Mp+Off. \qquad (Eq.\ 1)$$

The entry condition indicated by Eq. 1 (for an example A3 measurement reporting event) requires that the signal measurement of the neighbor cell (Mn) be greater than the signal measurement of the primary/serving cell (Mp) by at least an offset (Off). For example, the serving cell or network may configure the UE with an Off (offset) of 3 dB, to be applied to measurement reporting event A3. Thus, if Off is set (or configured) to 3 dB in this simple example, the entry condition for this A3 measurement reporting event would be fulfilled if the measured RSRP (as an example signal measurement, measured by the UE, which may first be filtered by the UE) of the neighbor cell is 3 dB (or more) greater (or stronger) than the measured RSRP of the serving cell (primary cell, or source cell). The measured signals (e.g., from the neighbor cell and the serving cell) may first be filtered (e.g., averaged) by the UE, before applying these measured signal values to Eq. 1 to determine whether the entry condition of the A3 measurement reporting event has been fulfilled. Also, for example, a time-to-trigger may be configured to be 100 ms, for this serving cell and/or for this UE. Thus, in this situation, the UE may send a measurement report to the serving cell (or a measurement report from the UE to the serving cell/serving network node or gNB is triggered) if the measured signal (e.g., measured RSRP) for the neighbor cell (Mn) is at least 3 dB greater than the measured signal (e.g., measured RSRP) for the serving cell (Mp), for at least TTT (e.g., at least for 100 ms in this example). Also, in some cases, based on such a received measurement report, the serving cell or serving network node (gNB, BS) may send a handover command to the UE to instruct or command the UE to perform a handover to the neighbor cell that triggered the transmission of the measurement report.

Figure 2:
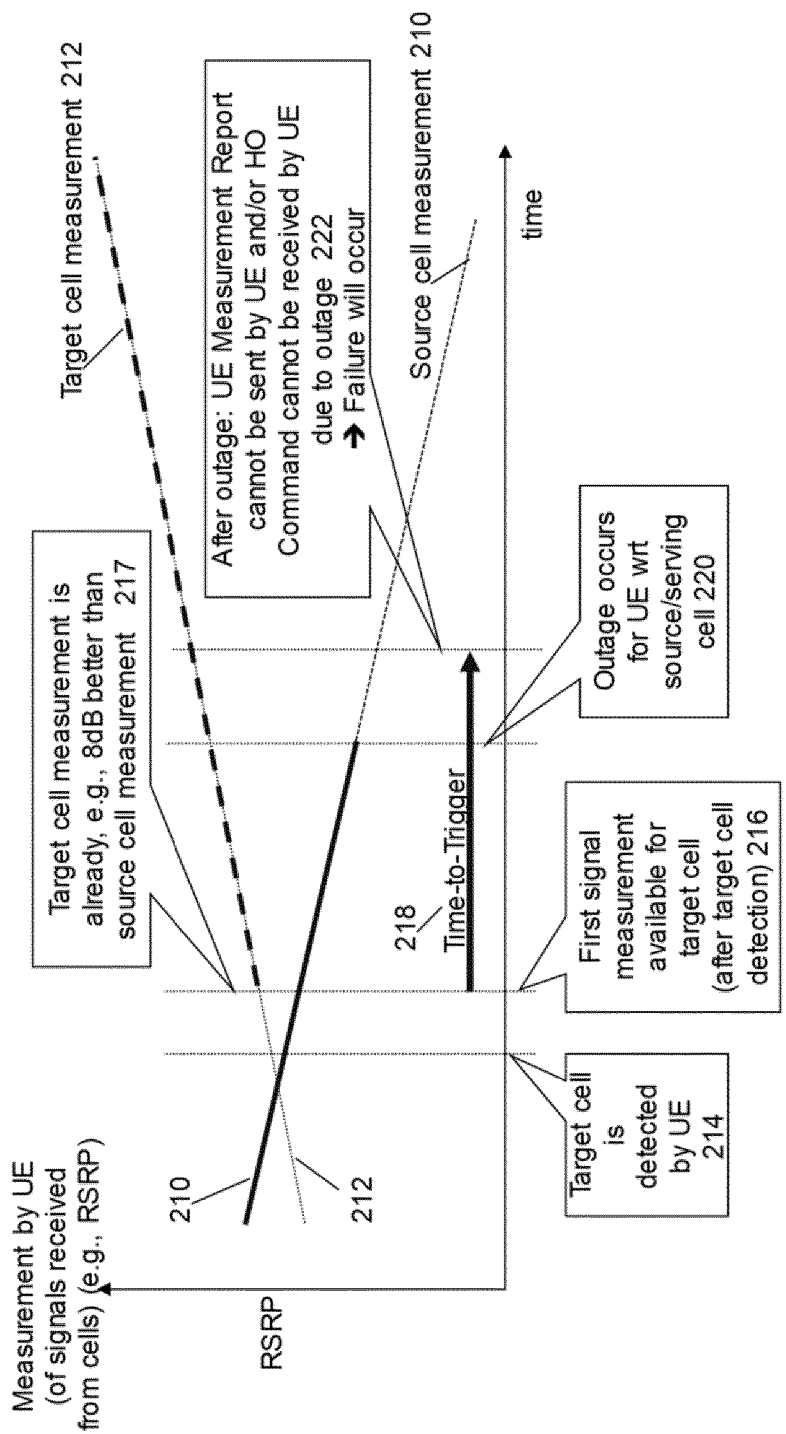
FIG. 2 is a diagram illustrating an example measurement reporting event.

FIG. 2 is a diagram illustrating an example A3 measurement reporting event. Time is shown on the horizontal axis, and the signal measurement value (e.g., RSRP) is shown in the vertical axis. In the example of FIG. 2, the entry condition for the A3 measurement report is described by Eq. 1, and where the offset (Off) is 3 dB, and TTT (time-to-trigger) may be set or configured to 100 ms (as an example). Thus, in this example A3 measurement reporting event illustrated in FIG. 2, the UE will send a measurement report to the serving cell (or a measurement report from the UE to the serving cell/serving network node or gNB is triggered) if the measured signal (e.g., measured RSRP) for the neighbor cell (Mn) is at least 3 dB greater than the measured signal (e.g., measured RSRP) for the serving cell (Mp), for at least TTT (e.g., at least for 100 ms in this example).

Referring to FIG. 2, a source cell measurement 210 (e.g., UE measured RSRP of reference signals from the source cell), and a target cell measurement 212 (e.g., UE measured RSRP of reference signals from the target cell) are shown. The source cell may, for example, be the cell that is currently serving the UE, or the cell to which the UE is currently connected. The target cell is first detected (e.g., detect PCI of target cell) by the UE at 214. The target cell may be a neighbor cell or a (e.g., nearby) non-serving cell (a cell that is currently not serving the UE). In this example, as shown in FIG. 2, the source cell measurement 210 may be decreasing over time (e.g., as the UE moves further away from source cell, for example), and target cell measurement 212 is increasing over time (e.g., as the UE may move closer to the target cell, for example).

After the PCI is determined or detected for the target cell at 214, the UE may begin to measure signals from the target cell. However, at least in some cases, after detecting the PCI of the neighbor cell, there may be some delay before a measurement of the target cell is first available to the UE for the neighbor cell, e.g., due to the signal filtering process of the measured RSRP of signals received from the target, cell. At 216, a first (or initial) signal measurement is now available to the UE for the target cell, after the target cell detection at 214. At 216 and 217, the target cell measurement 212 is already 8 dB better (higher) than the source cell measurement 210. Thus, at the first measurement (or first signal measurement), at 216, of the target cell, the target cell measurement 212 fulfills the entry condition for the example A3 measurement reporting event, which only requires the target cell measurement to be 3 dB greater (or better) than the source cell measurement. In this case, the entry condition is actually over-fulfilled (e.g., signal measurement of target cell exceeds the requirement for entry condition to be fulfilled), since 8 dB is greater than that required 3 dB offset required for the entry condition of the A3 measurement reporting event.

In an illustrative example of an A3 measurement reporting event, in order to trigger or cause a measurement report to be sent by the UE to the network node (gNB or BS), the target cell measurement must remain or continue to be at least 3 dB (or Offset) greater than the source cell measurement for at least a time-to-trigger (TTT) 218 (e.g., 100 ms in this example). However, a problem that occurs in the situation shown in FIG. 2 is that the source cell signal quality, e.g., the signal to noise ratio, (measured by measurement 210) continues to decrease rapidly, As a result, e.g., due to a fast signal attenuation or multi-path fading or other issue with respect to the source cell measurement 210, an outage (e.g., wireless service outage) for the UE with respect to the source (or serving) cell occurs at 220. The outage (or wireless service outage of the UE with respect to the source cell) may, for example, include where the UE may be unable to successfully transmit a measurement report to the network node (e.g., BS or gNB) and/or where the UE may be unable to receive (e.g., decode) at least some downlink control information (DCI), and thus the UE may not receive a handover command and/or may be unable to receive a handover command from the source cell. Thus, in this illustrative example, if the measurement report has not been sent by the UE, and a handover command received by the UE (e.g., instructing the UE to perform a handover to the target cell) before the outage at 220, then the UE may not perform the required handover to the target cell, and a failure, e.g., a radio link failure, may occur for the UE, and thus, resulting in service degradation such as a service interruption or disconnection.

However, a problem may occur, such as shown in FIG. 2, where an outage (e.g., wireless service outage for the UE with respect to the serving cell) (occurring at 220) may occur before the TTT timer has expired. As shown in FIG. 2, for example, a first signal measurement is available at 216 (since the target cell is first detected at 214), thus fulfilling (actually over-fulfilling) the entry condition for the A3 measurement reporting event. The TTT timer is initialized at 218, and expires at 222. Thus, the UE may be able to send a measurement report at 222 (at expiration of TTT timer). However, due to the outage at 220, the UE is unable to send a measurement report and/or may be unable to receive a handover command after 220. Thus, as shown, a failure in the communication service (e.g., such as a radio link failure) may occur at 222. In this example, the long TTT did not allow the UE to send a measurement report quickly enough, to avoid the outage or failure.

According to an example embodiment, rather than using one TTT value (or a fixed TTT value), a more flexible approach may be used by a UE, e.g., in which a variable or a selectable TTT value (e.g., out of a plurality of TTT values) may be used by a UE, depending on the situation. For example, a UE may be configured with a first time-to-trigger (TTT) value, and a second TTT value, where the second TTT value may be shorter than the first TTT value. This is an example, and two or more TTT values may be configured for use by the UE. A timing of when a target cell measurement (that fulfills an entry condition of a measurement reporting event) is determined by the UE may be used to select either the first TTT value or the second TTT value, for example. For example, if a first (or initial) measurement (e.g., RSRP or other signal measurement) by the UE of a signal received from a target (neighbor) cell after the UE detected (e.g., detected the PCI of) the target/neighbor cell fulfills the entry condition, then the UE may use the second (shorter) TTT value for triggering the transmission of the measurement report. Also, if a measurement by the UE of a signal from the target (neighbor) cell is determined by the UE within a threshold period of time (e.g., 10 ms) after the UE detected the target/neighbor cell (even if it is not the first measurement after target cell detection), the UE may use the second (shorter) TTT value for triggering the transmission of the measurement report.

Also, if a measurement of a signal from a neighbor or target cell results in an entry condition of a measurement reporting event to be over-fulfilled by at least a threshold amount (where the threshold amount may be fixed, or may be configured by a network or network node), then the UE may use the second (or shorter) TTT value for triggering transmission of a measurement report.

Otherwise, for example, if (e.g., one or more of or any of) these conditions are not met, then the UE may use the first (longer) TTT value for triggering a transmission of a measurement report.

In this manner, a more flexible approach may be provided in which variable TTT values, or a selectable TTT value (e.g., either a first TTT value or a second TTT value) may be selected by the UE for triggering a transmission of a measurement report, depending on the situation for the UE. For example, as noted, a shorter TTT value may be used for triggering transmission of a measurement report in the case of one or more of: 1) a first measurement of a target/neighbor cell signal since (or after) target cell detection that fulfills the entry condition of the measurement reporting event, 2) a measurement of a target/neighbor cell signal within a threshold period of time that fulfills the entry condition of the measurement reporting event, and/or 3) a measurement of a target/neighbor cell signal that results in the entry condition for the measurement reporting event being over-fulfilled (signal measurement for target cell exceeds the requirement for the entry condition to be fulfilled). For example, one or more of these three example situations noted may present a more persuasive or compelling case for immediately, or at least more quickly, transmitting the measurement report, via use of a shorter TTT value. Or, any of these 3 situations may also indicate circumstances in which there is a higher risk of an outage or failure for the UE with respect to the serving or source cell (e.g., if the default or first TTT value is used), and thus, in any of these situations, the second (shorter) TTT value (where the second TTT value may be zero, or may be any value that is less than the first TTT value). Therefore, when any or one or more of these 3 situations is present or detected by the UE, a shorter TTT value may be used for triggering transmission of the measurement report, which may allow a UE to more quickly send a measurement report (at least in some cases), and thus more likely avoid an outage or failure described above in FIG. 2.

Figure 3:
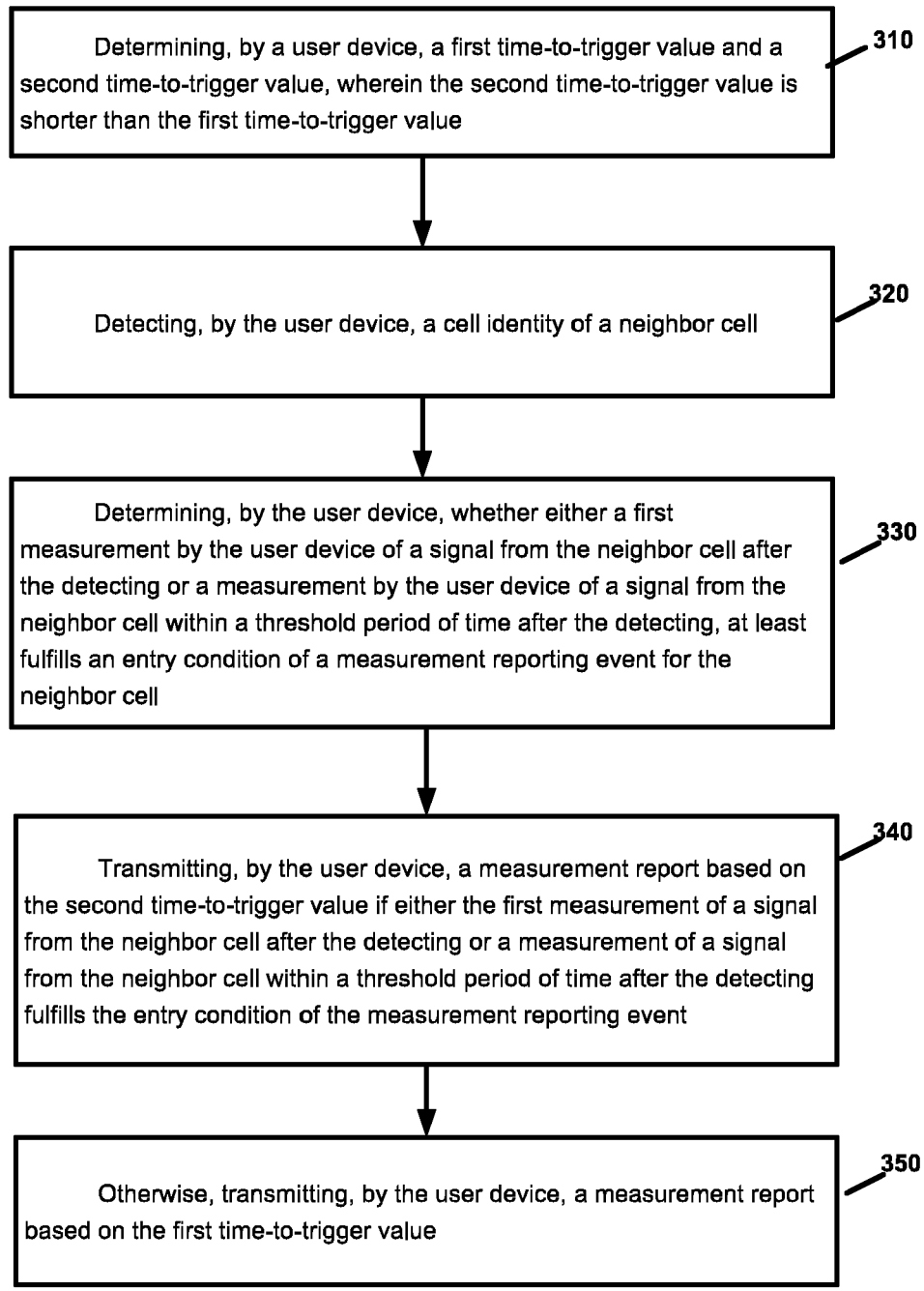
FIG. 3 is a flow chart illustrating operation of a user device or UE according an example embodiment.

FIG. 3 is a flow chart illustrating operation of a user device or UE according an example embodiment. Operation 310 includes determining, by a user device (UE), a first time-to-trigger value and a second time-to-trigger value, wherein the second time-to-trigger value is shorter than the first time-to-trigger value. Operation 320 includes detecting, by the user device, a cell identity of a neighbor cell. Operation 330 includes determining, by the user device, whether either a first measurement by the user device of a signal from the neighbor cell after the detecting or a measurement by the user device of a signal from the neighbor cell within a threshold period of time after the detecting, at least fulfills an entry condition of a measurement reporting event for the neighbor cell. Operation 340 includes transmitting, by the user device, a measurement report based on the second time-to-trigger value if either the first measurement of a signal from the neighbor cell after the detecting or a measurement of a signal from the neighbor cell within a threshold period of time after the detecting fulfills the entry condition of the measurement reporting event. And, operation 350 includes otherwise, transmitting, by the user device, a measurement report based on the first time-to-trigger value.

The method of FIG. 3 may include determining a first measurement, after the detecting, of a signal from the neighbor cell; wherein the determining comprises determining, by the user device, that the first measurement by the user device at least fulfills the entry condition of the measurement reporting event for the neighbor cell; and wherein the transmitting a measurement report based on the second time-to-trigger value comprises transmitting, by the user device, a measurement report in response to the entry condition being fulfilled at least for a period of time equal to the second time-to-trigger value.

The method of FIG. 3 may include determining, by the user device, a first or subsequent measurement, within the threshold period of time after the detecting, of a signal from the neighbor cell; wherein the determining comprises determining, by the user device, that the first or subsequent measurement, within the threshold period of time after the detecting, fulfills the entry condition of the measurement reporting event for the neighbor cell; and wherein the transmitting a measurement report based on the second time-to-trigger value comprises transmitting, by the user device, a measurement report in response to the entry condition being fulfilled at least for a period of time equal to the second time-to-trigger value. Thus, for example, in this case, even a second or third (or subsequent) measurement of the signal from the target/neighbor cell may cause the UE to use the second TTT value for triggering transmission of the measurement report, if the determining the measurement of the target/neighbor cell (which fulfills the entry condition occurs within a threshold period of time since the target/ neighbor cell was detected by the UE.

For the method of FIG. 3, the determining may include determining, by the user device, that the measurement of the signal from the neighbor (or target) cell results in the entry condition of the measurement reporting event being over-fulfilled in which the measurement of the signal of the neighbor cell exceeds a requirement of the entry condition of the measurement reporting event; and wherein the transmitting a measurement report based on the second time-to-trigger value is performed based on the entry condition of the measurement reporting event being over-fulfilled. A measurement of a signal from a target/neighbor cell that results in the entry condition being over-fulfilled may mean or may include where the measurement of the target/neighbor cell exceeds the requirement to fulfill the entry condition. For example, if the entry condition of a measurement reporting event requires the target/neighbor cell to be 3 dB greater than the source/serving cell signal measurement, then the entry condition would be fulfilled if the target/ neighbor signal measurement is 3 dB greater than the source/serving cell measurement, and the entry condition would be over-fulfilled if the target/neighbor cell measurement is more than 3 dB greater (e.g., 4 dB, 5 dB, 6 dB, 7 dB, (or more) etc., greater) than the source/serving cell signal measurement.

With respect to the method of FIG. 3, the determining a first time-to-trigger value and a second time-to-trigger value may include: receiving, by the user device from a serving cell, configuration information including information indicating the second time-to-trigger value or a plurality of second time-to-trigger values. Also, the second time-to-trigger value comprises a value that is greater than or equal to zero and less than the first time-to-trigger value. Also, the method(s) may include receiving, by the user device (or UE) from a serving cell, configuration information including information indicating at least a requirement or a minimum signal level of the measurement of the signal received from the neighbor cell for the entry condition of the measurement reporting event to be over-fulfilled.

Figure 4:
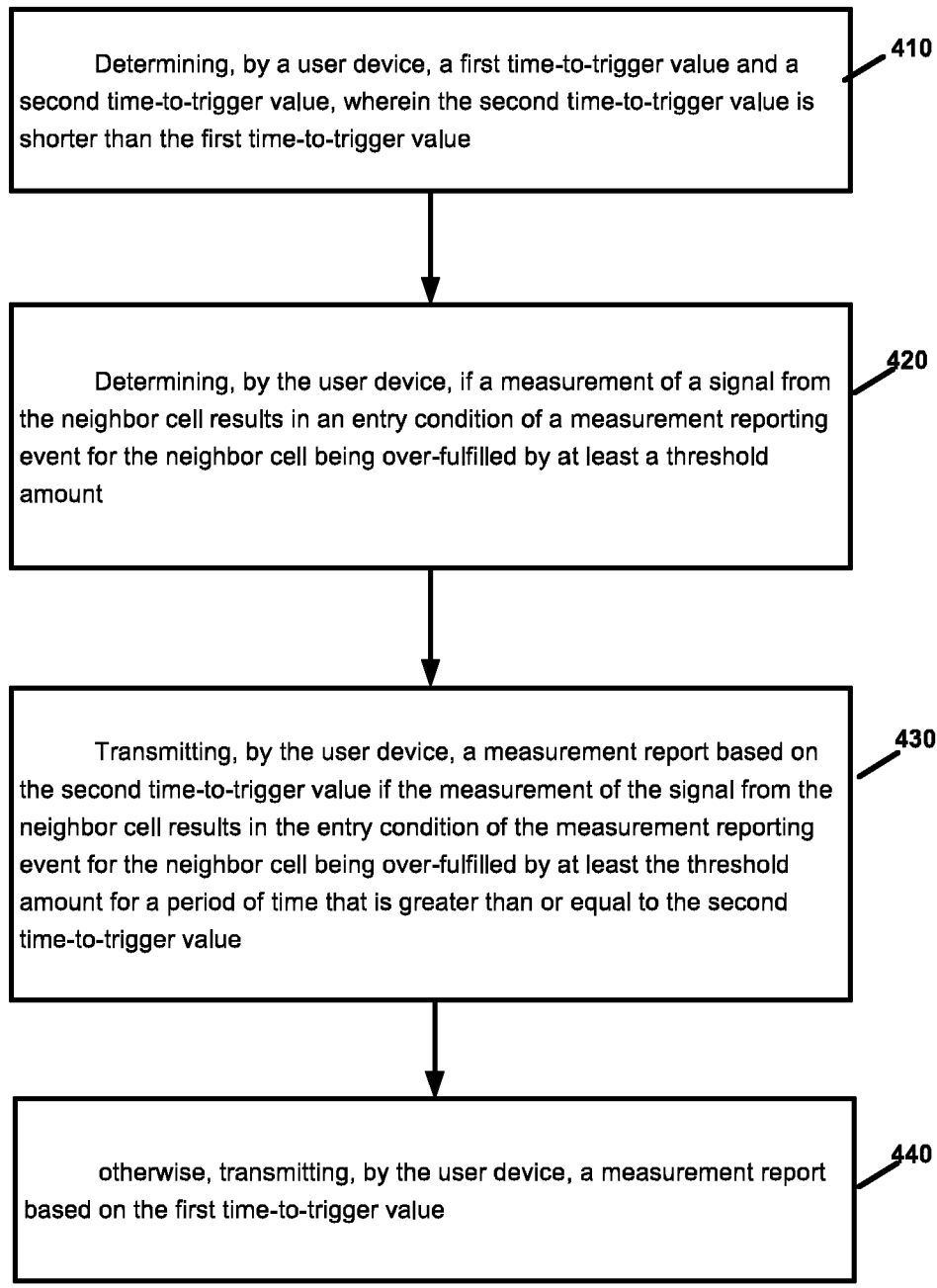
FIG. 4 is a flow chart illustrating operation of a user device or UE according another example embodiment.

FIG. 4 is a flow chart illustrating operation of a user device or UE according another example embodiment. Operation 410 includes determining, by a user device (UE), a first time-to-trigger value and a second time-to-trigger value, wherein the second time-to-trigger value is shorter than the first time-to-trigger value. The UE may also determine (e.g., receive) a threshold. Operation 420 includes determining, by the user device, if a measurement of a signal from the neighbor cell results in an entry condition of a measurement reporting event for the neighbor cell being over-fulfilled by at least a threshold amount. Operation 430 includes transmitting, by the user device, a measurement report based on the second time-to-trigger value if the measurement of the signal from the neighbor cell results in the entry condition of the measurement reporting event for the neighbor cell being over-fulfilled by at least the threshold amount for a period of time that is greater than or equal to the second time-to-trigger value. And, operation 440 includes otherwise, transmitting, by the user device, a measurement report based on the first time-to-trigger value.

With respect to the methods of FIGS. 3-4, the detecting a cell identity of a neighbor cell may include detecting a physical cell identity (PCI) of the neighbor cell as part of a cell search.

With respect to the methods of FIGS. 3-4, the second time-to-trigger value may include a plurality of second time-to-trigger values that are less than the first time-to-trigger value; further comprising, selecting one of the plurality of second time-to-trigger values based on an amount that the measurement reporting event is over-fulfilled; and wherein the transmitting comprises transmitting a measurement report based on the selected second time-to-trigger value of the plurality of second time-to-trigger values. For example, assuming an offset of 3 dB as described above, a second TTT value of 30 ms may be selected by the UE if the target/neighbor cell measurement is 3.1 dB-6 dB greater than the source/serving cell, and a second TTT value of 10 ms may be selected by the UE for triggering transmission of a measurement report if the target/neighbor cell measurement is 6.1+dB greater than the source/serving cell.

With respect to the method of FIG. 4, the method may include detecting, by the user device, a cell identity of a neighbor cell; wherein the transmitting may include: transmitting, by the user device, the measurement report based on the second time-to-trigger value if either a first measurement by the user device of a signal from the neighbor cell after the detecting or a measurement by the user device of a signal from the neighbor cell within a threshold period of time after the detecting, results in the entry condition of the measurement reporting event for the neighbor cell being over-fulfilled by at least the threshold amount for a period of time that is greater than or equal to the second time-to-trigger value.

With respect to the method of FIG. 4, the method may include detecting, by the user device, a cell identity of a neighbor cell; wherein the transmitting comprises: transmitting, by the user device, the measurement report based on the second time-to-trigger value if a first measurement by the user device of a signal from the neighbor cell after the detecting results in the entry condition of the measurement reporting event for the neighbor cell being over-fulfilled by at least the threshold amount for a period of time that is greater than or equal to the second time-to-trigger value.

With respect to the method of FIG. 4, the method may include detecting, by the user device, a cell identity of a neighbor cell; wherein the transmitting comprises: transmitting, by the user device, the measurement report based on the second time-to-trigger value if a measurement by the user device of a signal from the neighbor cell within a threshold period of time after the detecting results in the entry condition of the measurement reporting event for the neighbor cell being over-fulfilled by at least the threshold amount for a period of time that is greater than or equal to the second time-to-trigger value.

With respect to the method of FIG. 4, the method may include receiving, by the user device from a serving cell, configuration information including information indicating at least a requirement or a minimum signal level of the measurement of the signal from the neighbor cell for the entry condition of the measurement reporting event to be over-fulfilled.

Figure 5:
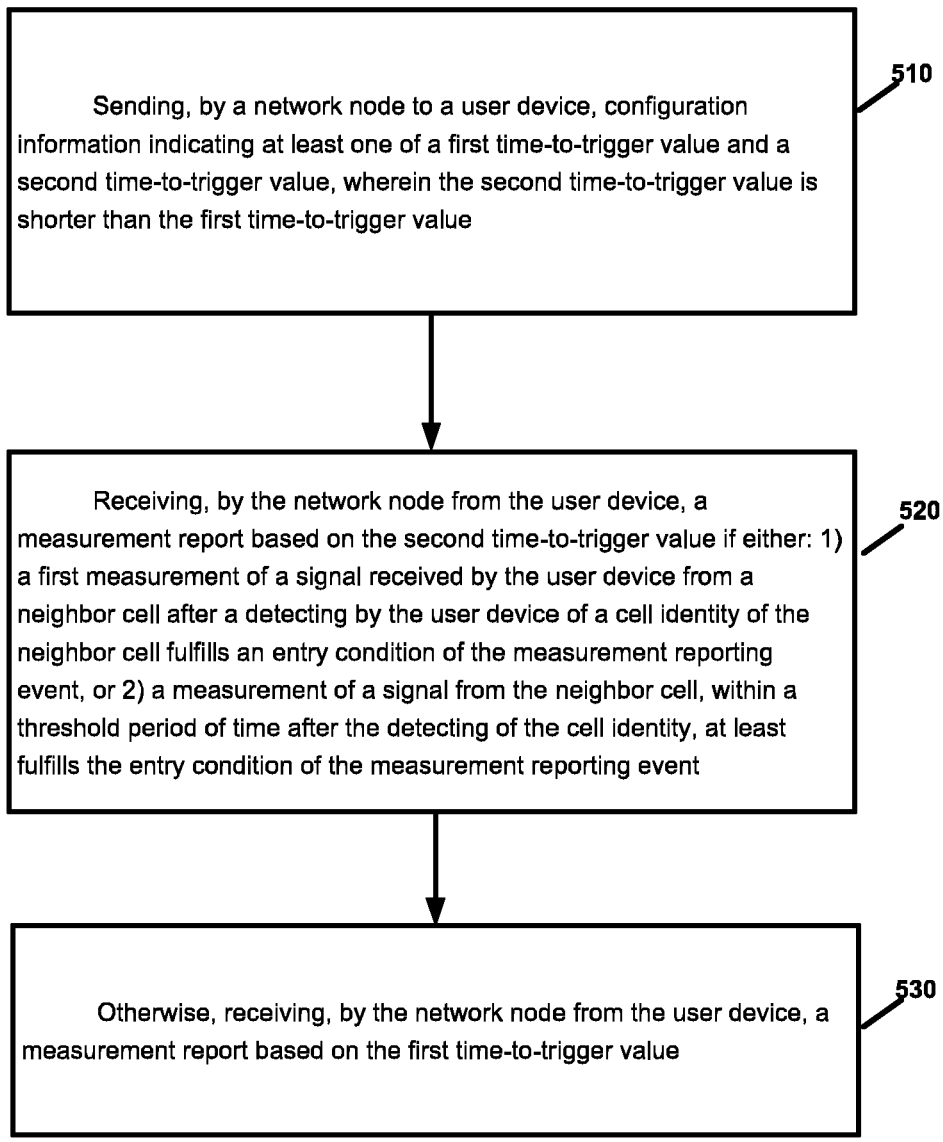
FIG. 5 is a flow chart illustrating operation of a network node according an example embodiment.

FIG. 5 is a flow chart illustrating operation of a network node (e.g., BS, gNB) according to an example embodiment. Operation 510 includes sending, by a network node to a user device, configuration information indicating at least one of a first time-to-trigger value and a second time-to-trigger value, wherein the second time-to-trigger value is shorter than the first time-to-trigger value. Operation 520 includes receiving, by the network node from the user device, a measurement report based on the second time-to-trigger value if either: 1) a first measurement of a signal received by the user device from a neighbor cell after a detecting by the user device of a cell identity of the neighbor cell fulfills an entry condition of the measurement reporting event, or 2) a measurement of a signal from the neighbor cell, within a threshold period of time after the detecting of the cell identity, at least fulfills the entry condition of the measurement reporting event. And, operation 530 includes otherwise, receiving, by the network node from the user device, a measurement report based on the first time-to-trigger value.

Figure 6:
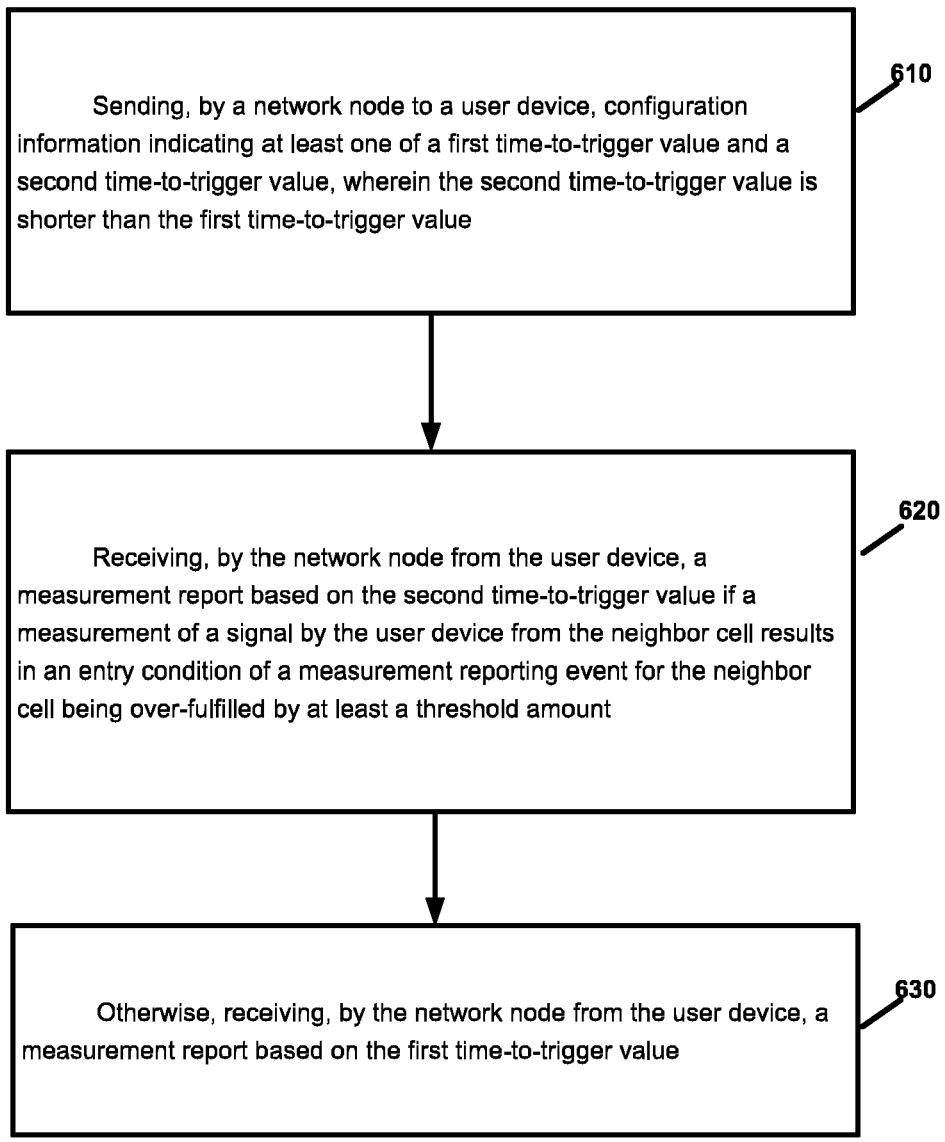
FIG. 6 is a flow chart illustrating operation of a network node according another example embodiment.

FIG. 6 is a flow chart illustrating operation of a network node (e.g., BS, gNB) according to another example embodiment. Operation 610 includes sending, by a network node to a user device, configuration information indicating at least one of a first time-to-trigger value and a second time-to-trigger value, wherein the second time-to-trigger value is shorter than the first time-to-trigger value. Operation 620 includes receiving, by the network node from the user device, a measurement report based on the second time-to-trigger value if a measurement of a signal by the user device from the neighbor cell results in an entry condition of a measurement reporting event for the neighbor cell being over-fulfilled by at least a threshold amount. Operation 630 otherwise, receiving, by the network node from the user device, a measurement report based on the first time-to-trigger value.

With respect to the method of FIG. 6, the method may include sending, by the network node to the user device, configuration information including information indicating at least a requirement or a minimum signal level of the measurement of the signal from the neighbor cell for the entry condition of the measurement reporting event to be over-fulfilled.

FIGS. 7-11 are diagrams that illustrate various details that may be used or provided (possibly in various combinations) with respect to one or more of the methods of FIGS. 3-6. Differences or variations in FIGS. 7-11, as compared to FIG. 2, are indicated for each of these figures. Also, in some cases, various embodiments or techniques described with respect to FIGS. 7-11 may be combined.

Figure 7:
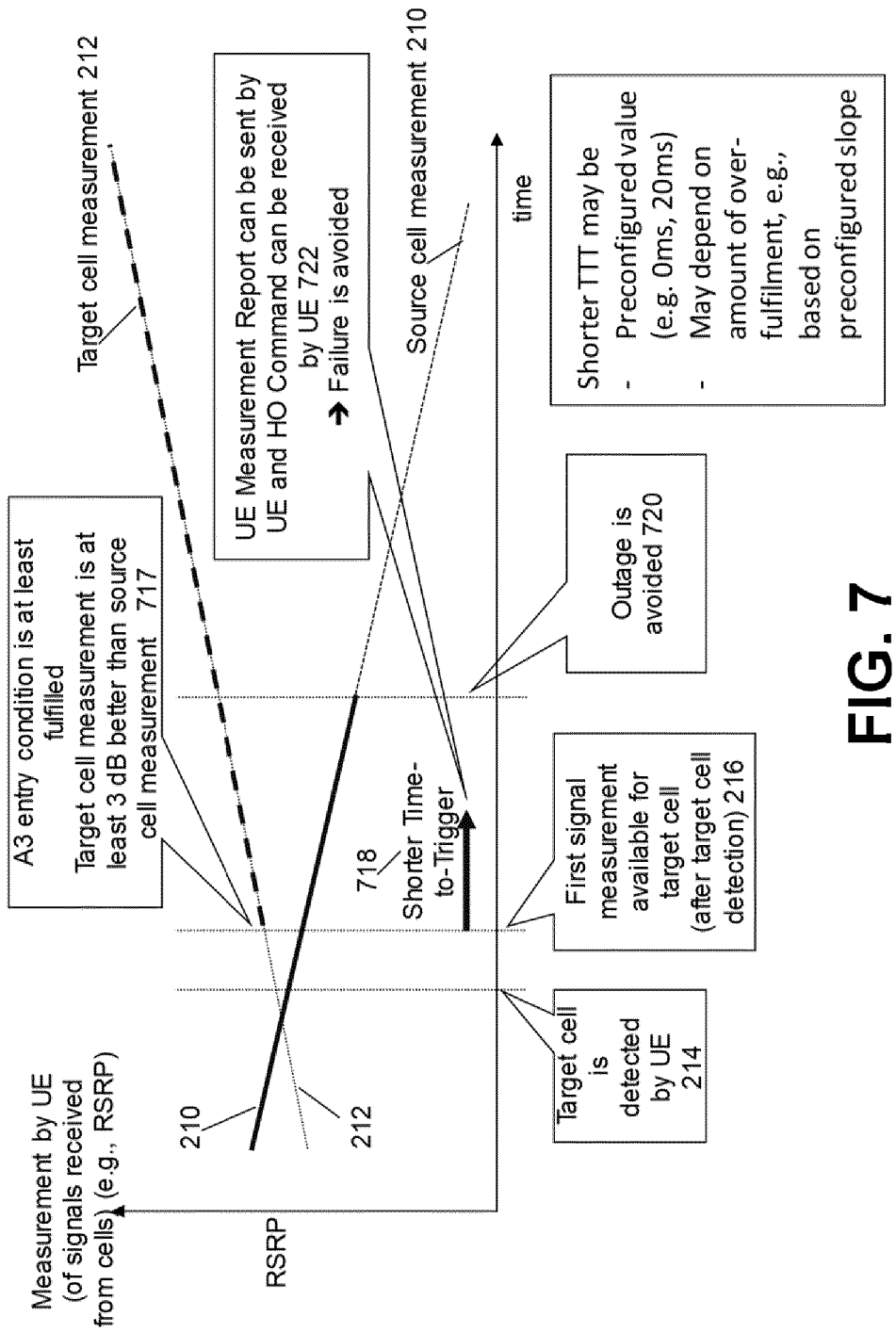
FIG. 7 is a diagram illustrating an example measurement reporting event in which a shorter time-to-trigger (TTT) value is used or selected by a user device (UE) based on a first signal measurement for a target/neighbor cell after cell detection that fulfills an entry condition for the measurement reporting event.

FIG. 7 is a diagram illustrating an example measurement reporting event in which a shorter time-to-trigger (TTT) value is used or selected by a user device (UE) based on a first signal measurement for a target/neighbor cell after cell detection that fulfills an entry condition for the measurement reporting event. In this example, a shorter (or second) TTT value will be used by the UE for triggering transmission of a measurement report if the first (since cell detection) signal measurement of a target/neighbor cell fulfills the entry condition. A source cell measurement 210 and a target cell measurement 212 are shown. The target/neighbor cell is detected at 214 (e.g., PCI of the target/neighbor cell is determined), and a first signal measurement (since the target cell detection at 214) is available to the UE at 216. At 717, the UE determines that the entry condition for the A3 measurement reporting event is fulfilled based on the first signal measurement (at 216), e.g., target/neighbor cell measurement is at least 3 dB greater than source cell measurement. In this case, because a first target/neighbor cell measurement, after the target/neighbor cell detection, fulfills the entry condition, the UE selects the second TTT or shorter TTT 718 to be used for causing or triggering the transmission of the measurement report. For example, a shorter TTT of, e.g., 0 ms (or causing immediate transmission of measurement report after entry condition is fulfilled at 717), 20 ms (which may cause UE to transmit/send the measurement report after 20 ms after entry condition is fulfilled at 717), 30 ms, 50 ms, . . . , or other TTT value, may be used for a second or shorter TTT value, as compared to maybe 100 ms for a first or longer TTT value. These are merely some example TTT values, and other TTT values may be used. In this case, at 722, the entry condition for the measurement reporting event is fulfilled (or met) for at least TTT, which triggers the UE to send/transmit the measurement report to the network node (e.g., BS or gNB), before a time 720 that an outage for the UE might occur. Thus, due to use of a shorter TTT value, the UE may (at 722) more quickly send a measurement report and also receive a handover command from the network node, before a time 720 where an outage for the UE may occur. Thus, in this case shown in FIG. 7, a potential outage and/or failure (e.g., which may have occurred at 720) is avoided. As noted, the shorter TTT value was selected based on a first signal measurement for the target/neighbor cell (the first or initial signal measurement after the target/neighbor cell was detected) fulfilling the entry condition for the measurement reporting event, which allowed the UE to more quickly send the measurement report and possibly receive a handover command from the network node, prior to a potential outage or failure.

Figure 8:
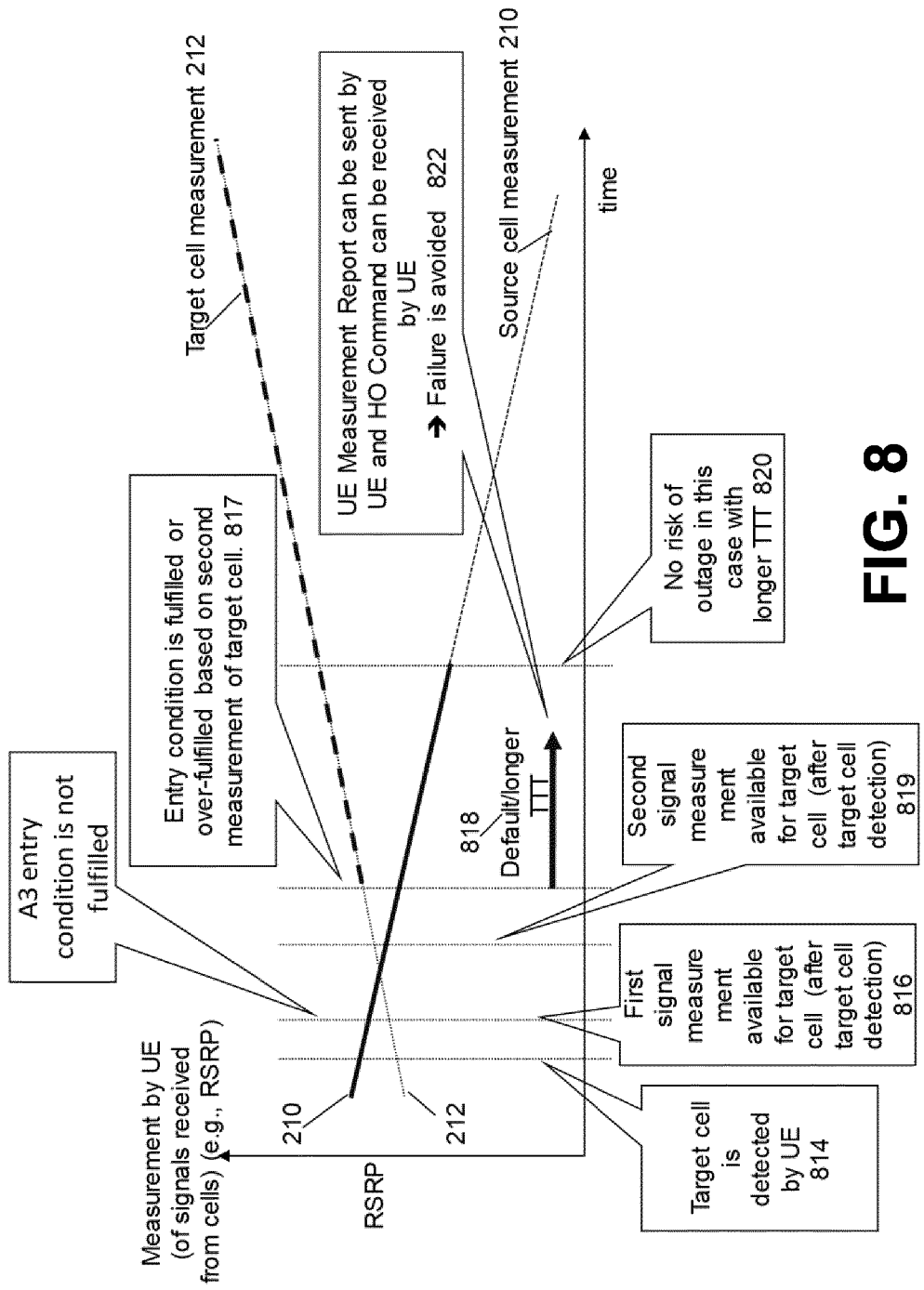
FIG. 8 is a diagram illustrating an example measurement reporting event in which a default or longer time-to-trigger (TTT) value is used by a user device (UE) because a first signal measurement for a target/neighbor cell after cell detection did not fulfill an entry condition for the measurement reporting event.

FIG. 8 is a diagram illustrating an example measurement reporting event in which a default or longer time-to-trigger (TTT) value is used by a user device (UE) because a first signal measurement for a target/neighbor cell after cell detection did not fulfill an entry condition for the measurement reporting event. In this example, a shorter (or second) TTT value will be used by the UE for triggering transmission of a measurement report if the first (since cell detection) signal measurement of a target/neighbor cell fulfills the entry condition. With reference to FIG. 8, a source cell measurement 210 and a target cell measurement 212 are shown. The target/neighbor cell is detected at 814 (e.g., PCI of the target/neighbor cell is determined), and a first signal measurement (since the target cell detection at 214) is available to the UE at 816. At (or shortly after) 816, the UE determines that the entry condition for the measurement reporting event is not fulfilled based on the first signal measurement for the target/neighbor cell. Thus, unlike the example of FIG. 7, in FIG. 8 the first (since target/neighbor cell detection) signal measurement by the UE of the target/neighbor cell is not sufficient to fulfill the entry condition. For example, the target cell measurement may have been only 2 dB greater than the source cell measurement, thus, not fulfilling the entry condition of requiring the target cell to be at least 3 dB greater than source signal measurement. Although, at 819, a second (or subsequent) signal measurement is available to the UE. At 817, the UE determines that the entry condition for the measurement reporting event is fulfilled based on the second signal measurement (at 819). However, in this example case illustrated in FIG. 8, the criteria (first signal measurement since cell detection that fulfills the entry condition) for selecting the second or shorter TTT value was not met (even if a subsequent target cell measurement did fulfill the entry requirement). Thus, in this example case shown in FIG. 8, the default or longer TTT value 818 is selected by the UE to trigger transmission of the measurement report because the first signal measurement 816 (since cell detection by UE) did not fulfill the entry condition. As noted, at 817, the UE determines that the second signal measurement (at 819) fulfills the entry condition, and thus, the longer TTT value 818 is used by the UE to trigger transmission of the measurement report, and for example, no outage at 820, or failure at 822 occurs.

Figure 9:
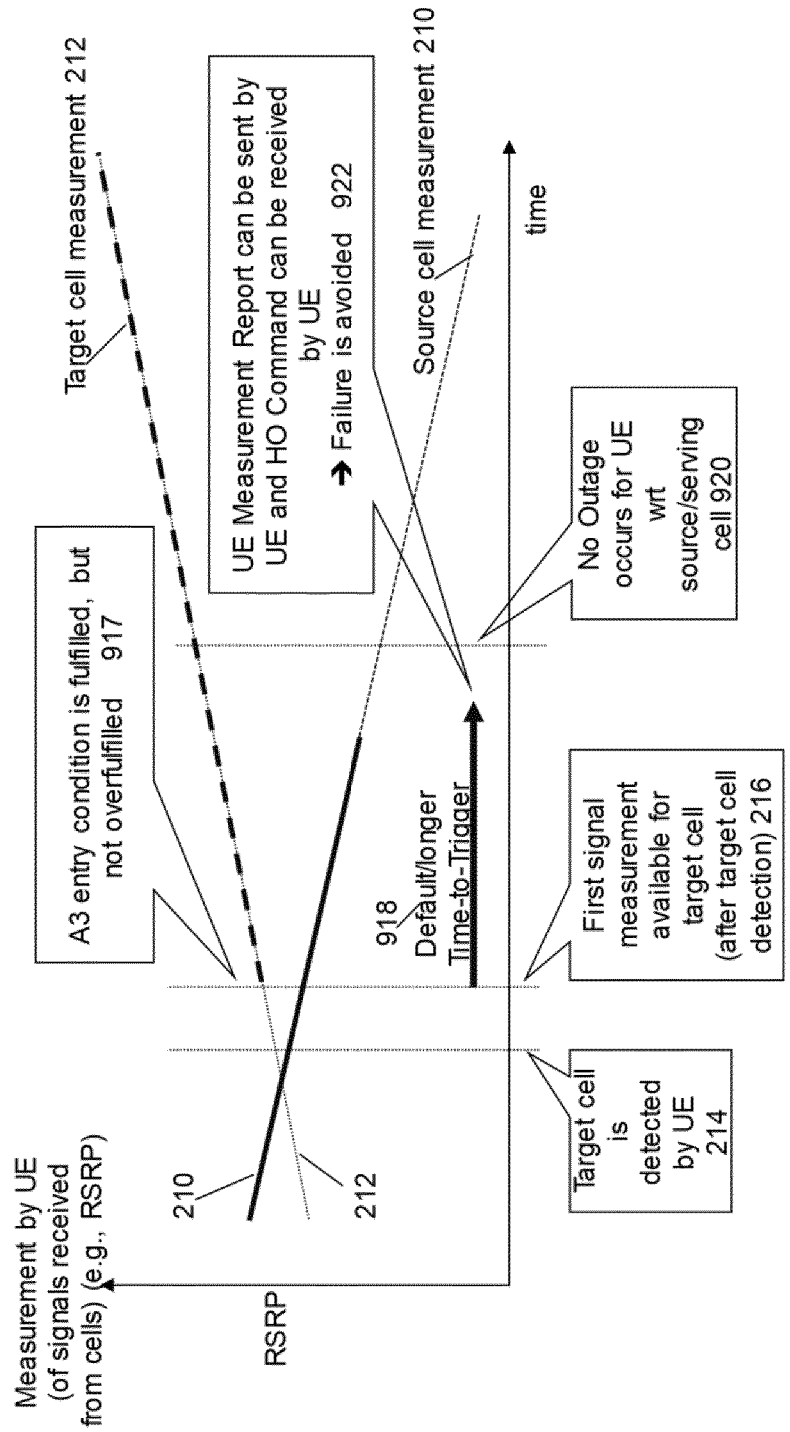
FIG. 9 is a diagram illustrating an example measurement reporting event in which a default or longer time-to-trigger (TTT) value is used by a user device (UE) because a first signal measurement for a target/neighbor cell after cell detection did not over-fulfill an entry condition by at least a threshold amount.

FIG. 9 is a diagram illustrating an example measurement reporting event in which a default or longer time-to-trigger (TTT) value is used by a user device (UE) because a first signal measurement for a target/neighbor cell after cell detection did not over-fulfill an entry condition by at least a threshold amount. In this example, a shorter (or second) TTT value will be used by the UE for triggering transmission of a measurement report if the first (since cell detection) signal measurement of a target/neighbor cell over-fulfills the entry condition by at least a threshold amount (e.g., 3 dB). With reference to FIG. 9, a source cell measurement 210 and a target cell measurement 212 are shown. The target/neighbor cell is detected at 214 (e.g., PCI of the target/neighbor cell is determined), and a first signal measurement (since the target cell detection at 214) is available to the UE at 216. At 917, the UE determines that, based on the first signal measurement of the target/neighbor cell at 216, the entry condition for the measurement reporting event is fulfilled, but is not over-fulfilled by at least a threshold amount. In this case, the criteria for using the second (or shorter TTT) value is not met. Therefore, at 918, the UE uses the default/longer TTT value for triggering transmission of the measurement report. In this example, no outage occurs at 920, and no failure occurs at 922, for example.

Figure 10:
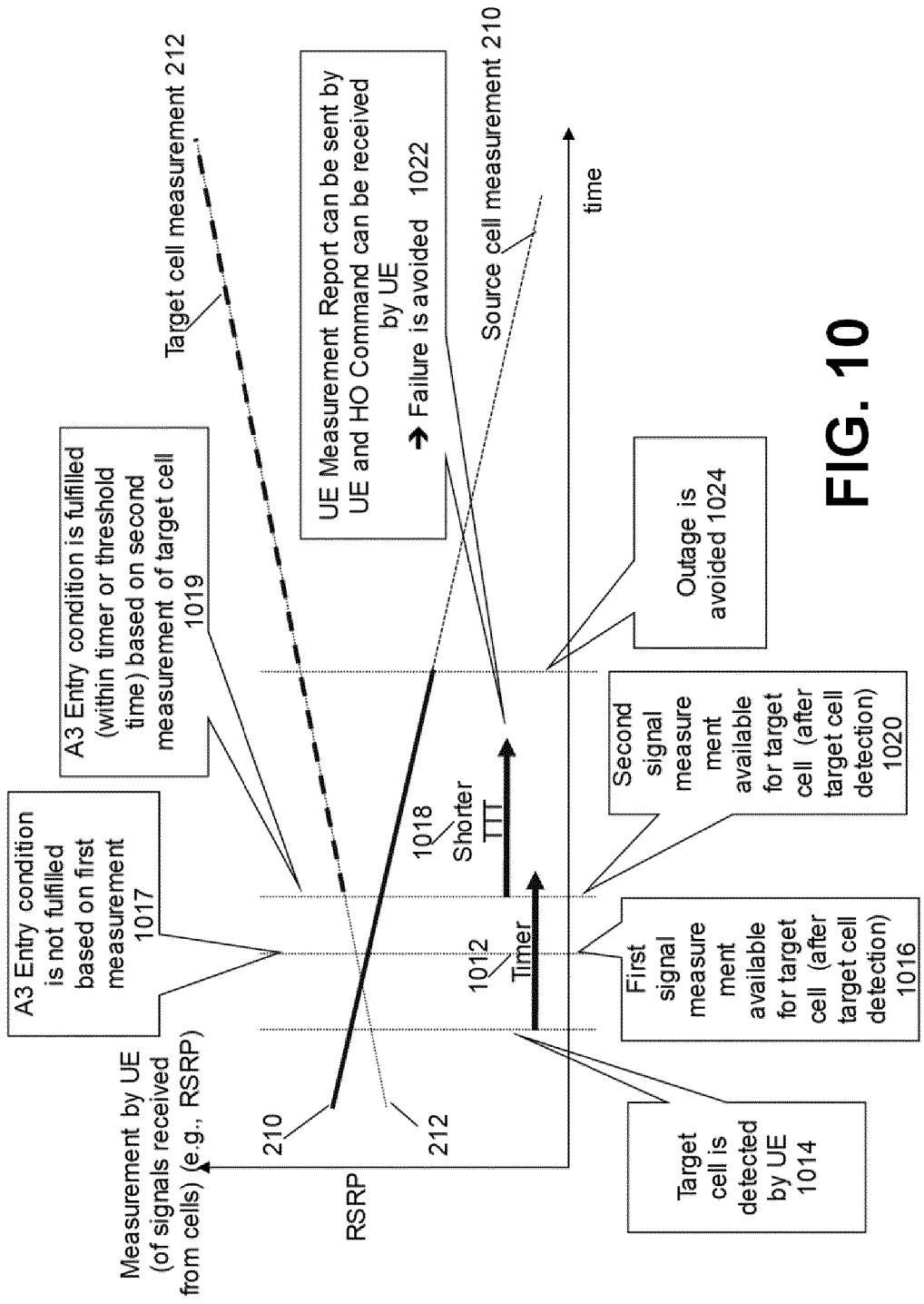
FIG. 10 is a diagram illustrating an example measurement reporting event in which a shorter time-to-trigger (TTT) value is used by a user device (UE) because a signal measurement for a target/neighbor cell within a threshold period of time after target/neighbor cell detection fulfills an entry condition for the measurement reporting event.

FIG. 10 is a diagram illustrating an example measurement reporting event in which a shorter time-to-trigger (TTT) value is used by a user device (UE) because a signal measurement for a target/neighbor cell within a threshold period of time after target/neighbor cell detection fulfills an entry condition for the measurement reporting event. In this example, a shorter (or second) TTT value will be used by the UE for triggering transmission of a measurement report if a signal measurement of a target/neighbor cell determined (or obtained) by the UE within a threshold period of time fulfills the entry condition. Thus, in the example of FIG. 10, a timer 1012 is initialized and started at 1014 when the target/neighbor cell is detected. With reference to FIG. 10, a source cell measurement 210 and a target cell measurement 212 are shown. The target/neighbor cell is detected at 1014 (e.g., PCI of the target/neighbor cell is determined), and a first signal measurement (since the target cell detection at 1014), before expiry of the timer 1012 (within a threshold period of time since target cell detection), is available to the UE at 1016. At 1017, it is determined that the first signal measurement of the target/neighbor cell does not fulfill the entry condition. A second signal measured is available or determined by the UE at 1020, still before expiration (expiry) of the timer 1012, and thus the second target/neighbor cell signal measurement 1020 is provided (or available) to the UE within a threshold period of time since target/neighbor cell detection at 1014. Thus, at 1019, the UE determines that the measurement reporting event entry condition is fulfilled, based on the second signal measurement at 1020, within the threshold period of time of target/neighbor cell detection (e.g., before expiry of timer 1012). Thus, based on the criteria for the shorter TTT being fulfilled or met, the UE uses a shorter TTT value 1018 to trigger transmission of the measurement report to the network node. As a result, an outage is avoided at 1024, and the UE is able to transmit a measurement report and receive a HO command at 1022 (and failure is avoided at 1022).

Figure 11:
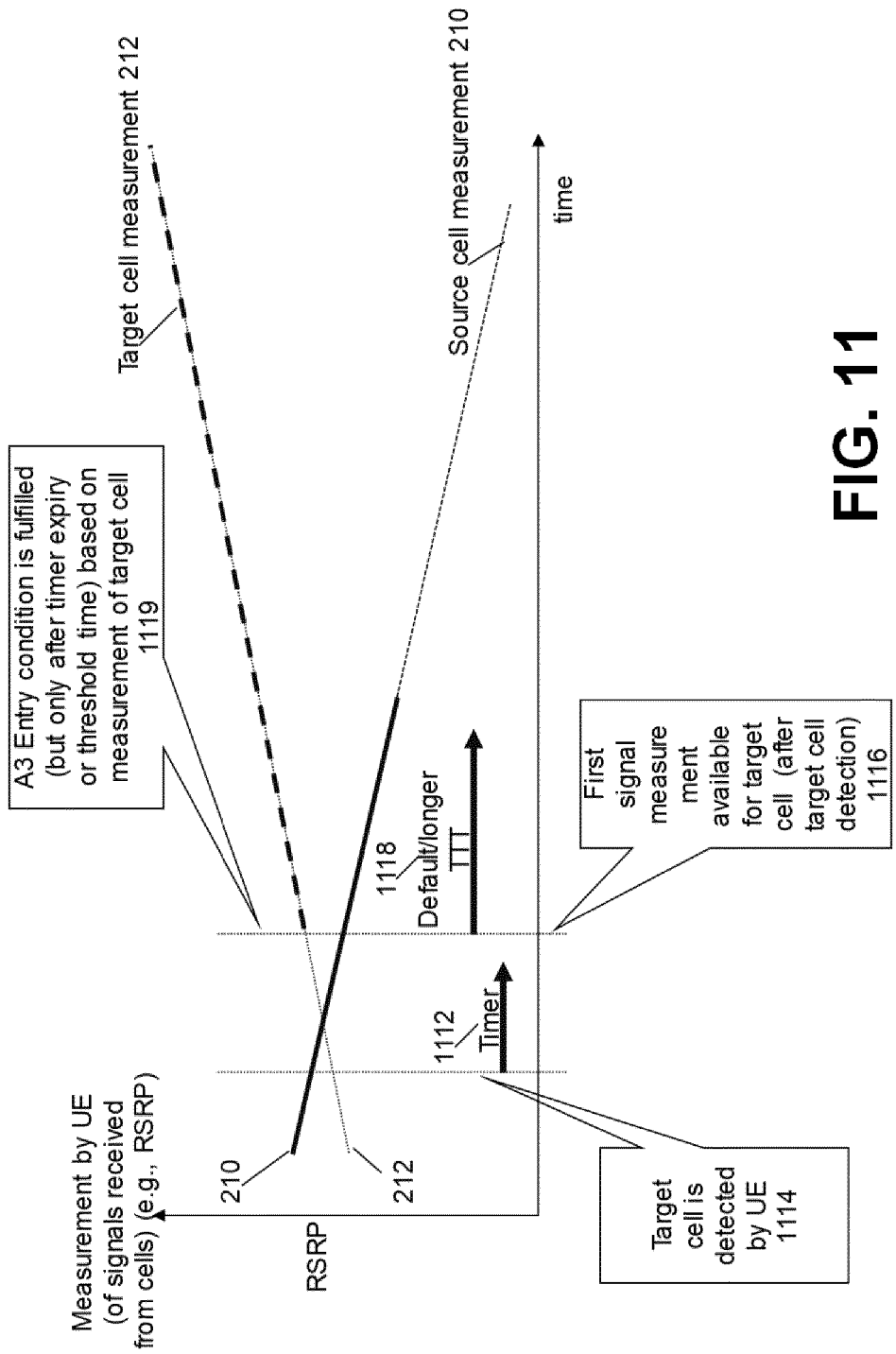
FIG. 11 is a diagram illustrating an example measurement reporting event in which a default or longer time-to-trigger (TTT) value is used by a user device (UE) because a signal measurement for a target/neighbor cell that fulfills an entry condition is not provided or available to the UE within a threshold period of time after target/neighbor cell detection.

FIG. 11 is a diagram illustrating an example measurement reporting event in which a default or longer time-to-trigger (TTT) value is used by a user device (UE) because a signal measurement for a target/neighbor cell that fulfills an entry condition is not provided or available to the UE within a threshold period of time after target/neighbor cell detection. In this example, a shorter (or second) TTT value will be used by the UE for triggering transmission of a measurement report if a signal measurement of a target/neighbor cell is determined (or obtained) by the UE within a threshold period of time that fulfills the entry condition. With reference to FIG. 11, a source cell measurement 210 and a target cell measurement 212 are shown. The target/neighbor cell is detected at 1114 (e.g., PCI of the target/neighbor cell is determined by the UE). Also, in the example of FIG. 11, a timer 1112 is initialized and started at 1114 when the target/neighbor cell is detected. At 1116, after expiration of the timer 1112, a first signal measurement (since the target cell detection at 1114) is determined by the UE or obtained or available to the UE, after expiration of the timer 1112. Thus, the first signal measurement for target/neighbor cell is available to or determined by the UE (at 1116) after a threshold period of time after UE detection of the target/neighbor cell at 1114. At 1119, it is determined that the first signal measurement of the target/neighbor cell fulfills the entry condition. However, as noted, the first signal measurement at 1116 is not determined (or provided or made available to the UE) by the UE within a threshold period of time after target cell detection (before expiry of the timer 1112). Thus, in this example of FIG. 11, the criteria to use or select a shorter TTT value is not met. As a result, a default or longer TTT value 1118 is used to trigger transmission of the measurement report Alternatively, the examples of FIGS. 10-11 may use a criteria, to use or select the shorter TTT value to trigger transmission of the measurement report, that requires the target/neighbor cell signal measurement, within a threshold period of time, cause the entry condition to be over-fulfilled by at least a threshold amount (not merely fulfilled.

Also, using the A3 measurement reporting event as an example. An over-fulfillment may be defined as:

$$\text{overfulfillment} = Mn - Mp - \text{Off, where Off is offset,}$$
Mn is neighbor cell signal value, and Mp is primary/serving cell signal measurement.

TTT may be scaled by setting TTT=0 if the over-fulfillment exceeds a certain value: overfulfillment>value Also, TTT may be scaled depending on the (amount of) over-fulfillment of the entry condition. A new TTT_new (or a second/shorter TTT) may be calculated by scaling the configured TTT by the following rule:

$$TTT\_new = \max(0, \text{default\_TTT} * (1 - \text{overfulfillment} * \text{slope}))$$

Where default_TTT is the longer/default_TTT value, TTT_new is the shorter TTT value (that may be used in certain circumstances, e.g., as described herein), overfulfillment indicates an amount or percentage that the target cell measurement overfulfills (or exceeds the requirement) of the entry condition for the measurement reporting event, "slope" defines how strong (or how sharply) TTT is shortened and may be configured by the network as part of measurement configuration. The max operator provides (in this example) that TTT is never negative. As long as overfulfillment is not negative, TTT_new will not be larger than default_TTT. Slope refers to by how much (quantity or beyond a threshold) that the target cell measurement exceeds the entry condition requirement. A shorter TTT may increase a likelihood that a measurement report may be successfully transmitted to the network node, and/or that a handover command may be received by the UE from the network node Example 1. A method comprising: determining, by a user device, a first time-to-trigger value and a second time-to-trigger value, wherein the second time-to-trigger value is shorter than the first time-to-trigger value; detecting, by the user device, a cell identity of a neighbor cell; determining, by the user device, whether either a first measurement by the user device of a signal from the neighbor cell after the detecting or a measurement by the user device of a signal from the neighbor cell within a threshold period of time after the detecting, at least fulfills an entry condition of a measurement reporting event for the neighbor cell; transmitting, by the user device, a measurement report based on the second time-to-trigger value if either the first measurement of a signal from the neighbor cell after the detecting or a measurement of a signal from the neighbor cell within a threshold period of time after the detecting fulfills the entry condition of the measurement reporting event; and otherwise, transmitting, by the user device, a measurement report based on the first time-to-trigger value.

Example 2. The method of example 1 wherein the detecting a cell identity of a neighbor cell comprises detecting a physical cell identity (PCI) of the neighbor cell as part of a cell search.

Example 3. The method of any of examples 1-2, comprising: determining a first measurement, after the detecting, of a signal from the neighbor cell; wherein the determining comprises determining, by the user device, that the first measurement by the user device fulfills the entry condition of the measurement reporting event for the neighbor cell; and wherein the transmitting a measurement report based on the second time-to-trigger value comprises transmitting, by the user device, a measurement report in response to the entry condition being fulfilled at least for a period of time equal to the second time-to-trigger value.

Example 4. The method of any of examples 1-3, comprising: determining, by the user device, a first or subsequent measurement, within the threshold period of time after the detecting, of a signal from the neighbor cell; wherein the determining comprises determining, by the user device, that the first or subsequent measurement, within the threshold period of time after the detecting, fulfills the entry condition of the measurement reporting event for the neighbor cell; and wherein the transmitting a measurement report based on the second time-to-trigger value comprises transmitting, by the user device, a measurement report in response to the entry condition being fulfilled at least for a period of time equal to the second time-to-trigger value.

Example 5. The method of any of examples 1-4, comprising: wherein the determining comprises determining, by the user device, that the measurement of the signal from the neighbor cell results in the entry condition of the measurement reporting event being over-fulfilled in which the measurement of the signal of the neighbor cell exceeds a requirement of the entry condition of the measurement reporting event; and wherein the transmitting a measurement report based on the second time-to-trigger value is performed based on the entry condition of the measurement reporting event being over-fulfilled.

Example 6. The method of example 5, wherein the second time-to-trigger value comprises a plurality of second time-to-trigger values that are less than the first time-to-trigger value; further comprising, selecting one of the plurality of second time-to-trigger values based on an amount that the measurement reporting event is over-fulfilled; and wherein the transmitting comprises transmitting a measurement report based on the selected second time-to-trigger value of the plurality of second time-to-trigger values.

Example 7. The method of any of examples 1-6, wherein the determining a first time-to-trigger value and a second time-to-trigger value comprises: receiving, by the user device from a serving cell, configuration information including information indicating the second time-to-trigger value or a plurality of second time-to-trigger values.

Example 8. The method of any of examples 1-7 wherein the second time-to-trigger value comprises a value that is greater than or equal to zero and less than the first time-to-trigger value.

Example 9. The method of any of examples 5-6, comprising: receiving, by the user device from a serving cell, configuration information including information indicating at least a requirement or a minimum signal level of the measurement of the signal received from the neighbor cell for the entry condition of the measurement reporting event to be over-fulfilled.

Example 10. The method of any of examples 1-9, wherein the determining the second time-to-trigger (TTT) value comprises: receiving, by the user device, a measurement configuration including at least information or one or more parameters that indicates, or may be used by the user device to determine, the second TTT value.

Example 11. The method of any of examples 1-10, wherein the determining the second time-to-trigger (TTT) value comprises: determining the second TTT value of zero if the entry condition is over-fulfilled by a threshold amount.

Example 12. The method of any of examples 1-11, wherein the determining the second time-to-trigger (TTT) value comprises: determining the second TTT value based on amount of over-fulfillment of the entry condition.

Example 13. An apparatus comprising means for performing the method of any of examples 1-12.

Example 14. A computer program comprising instructions which, when the program is executed by a computer, cause the computer to carry out the method of any of examples 1-12.

Example 15. An apparatus comprising: at least one processor; and at least one memory including computer program code; the at least one memory and the computer program code configured to, with the at least one processor, cause the apparatus at least to perform the method of any of examples 1-12.

Example 16. An apparatus comprising: at least one processor; and at least one memory including computer program code; the at least one memory and the computer program code configured to, with the at least one processor, cause the apparatus to: determine, by a user device, a first time-to-trigger value and a second time-to-trigger value, wherein the second time-to-trigger value is shorter than the first time-to-trigger value; detect, by the user device, a cell identity of a neighbor cell; determine, by the user device, whether either a first measurement by the user device of a signal from the neighbor cell after the detecting or a measurement by the user device of a signal from the neighbor cell within a threshold period of time after the detecting, at least fulfills an entry condition of a measurement reporting event for the neighbor cell; transmit, by the user device, a measurement report based on the second time-to-trigger value if either the first measurement of a signal from the neighbor cell after the detecting or a measurement of a signal from the neighbor cell within a threshold period of time after the detecting fulfills the entry condition of the measurement reporting event; and otherwise, transmit, by the user device, a measurement report based on the first time-to-trigger value.

Example 17. The apparatus of example 16 wherein being configured to cause the apparatus to detect a cell identity of a neighbor cell comprises being configured to cause the apparatus to detect a physical cell identity (PCI) of the neighbor cell as part of a cell search.

Example 18. The apparatus of any of examples 16-17, comprising being configured to cause the apparatus to: determine a first measurement, after the detecting, of a signal from the neighbor cell; determine, by the user device, that the first measurement by the user device fulfills the entry condition of the measurement reporting event for the neighbor cell; and wherein being configured to cause the apparatus to transmit, by the user device, a measurement report based on the second time-to-trigger value comprises being configured to cause the apparatus to transmit a measurement report based on the second time-to-trigger value a measurement report in response to the entry condition being fulfilled at least for a period of time equal to the second time-to-trigger value.

Example 19. The apparatus of any of examples 16-18, comprising being configured to cause the apparatus to: determine, by the user device, a first or subsequent measurement, within the threshold period of time after the detecting, of a signal from the neighbor cell; wherein being configured to cause the apparatus to determine comprises being configured to determine, by the user device, that the first or subsequent measurement, within the threshold period of time after the detecting, fulfills the entry condition of the measurement reporting event for the neighbor cell; and wherein being configured to cause the apparatus to transmit comprises being configured to cause the apparatus to transmit, by the user device, a measurement report in response to the entry condition being fulfilled at least for a period of time equal to the second time-to-trigger value.

Example 20. The apparatus of any of examples 16-19: wherein being configured to cause the apparatus to determine comprises being configured to cause the apparatus to determine, by the user device, that the measurement of the signal from the neighbor cell results in the entry condition of the measurement reporting event being over-fulfilled in which the measurement of the signal of the neighbor cell exceeds a requirement of the entry condition of the measurement reporting event; and wherein being configured to cause the apparatus to transmit comprises being configured to cause the apparatus to transmit a measurement report based on the second time-to-trigger value based on the entry condition of the measurement reporting event being over-fulfilled.

Example 21. The apparatus of example 20, wherein the second time-to-trigger value comprises a plurality of second time-to-trigger values that are less than the first time-to-trigger value; further comprising being configured to cause the apparatus to select one of the plurality of second time-to-trigger values based on an amount that the entry condition for the measurement reporting event is over-fulfilled; and wherein being configured to cause the apparatus to transmit comprises being configured to cause the apparatus to transmit a measurement report based on the selected second time-to-trigger value of the plurality of second time-to-trigger values.

Example 22. The apparatus of any of examples 16-21, wherein being configured to cause the apparatus to determine a first time-to-trigger value and a second time-to-trigger value comprises being configured to cause the apparatus to: receive, by the user device from a serving cell, configuration information including information indicating at least the second time-to-trigger value or a plurality of second time-to-trigger values.

Example 23. The apparatus of any of examples 16-22 wherein the second time-to-trigger value comprises a value that is greater than or equal to zero and less than the first time-to-trigger value.

Example 24. The apparatus of any of examples 20-21, comprising being configured to cause the apparatus to: receive, by the user device from a serving cell, configuration information including information indicating at least a requirement or a minimum signal level of the measurement of the signal received from the neighbor cell for the entry condition of the measurement reporting event to be over-fulfilled.

Example 25. The apparatus of any of examples 16-24, wherein being configured to cause the apparatus to determine the second time-to-trigger (TTT) value comprises being configured to cause the apparatus to: receive, by the user device, a measurement configuration including at least information or one or more parameters that indicates, or may be used by the user device to determine, the second TTT value.

Example 26. The apparatus of any of examples 16-25, wherein being configured to cause the apparatus to determine the second time-to-trigger (TTT) value comprises being configured to cause the apparatus to: determine the second TTT value of zero if the entry condition is over-fulfilled by a threshold amount.

Example 27. The apparatus of any of examples 16-26, wherein being configured to cause the apparatus to determine the second time-to-trigger (TTT) value comprises being configured to cause the apparatus to: determine the second TTT value based on amount of over-fulfillment of the entry condition.

Example 28. A method comprising: determining, by a user device, a first time-to-trigger value and a second time-to-trigger value, wherein the second time-to-trigger value is shorter than the first time-to-trigger value; determining, by the user device, if a measurement of a signal from the neighbor cell results in an entry condition of a measurement reporting event for the neighbor cell being over-fulfilled by at least a threshold amount; transmitting, by the user device, a measurement report based on the second time-to-trigger value if the measurement of the signal from the neighbor cell results in the entry condition of the measurement reporting event for the neighbor cell being over-fulfilled by at least the threshold amount for a period of time that is greater than or equal to the second time-to-trigger value; and otherwise, transmitting, by the user device, a measurement report based on the first time-to-trigger value.

Example 29. The method of example 28, comprising: detecting, by the user device, a cell identity of a neighbor cell; wherein the transmitting comprises: transmitting, by the user device, the measurement report based on the second time-to-trigger value if either a first measurement by the user device of a signal from the neighbor cell after the detecting or a measurement by the user device of a signal from the neighbor cell within a threshold period of time after the detecting, results in the entry condition of the measurement reporting event for the neighbor cell being over-fulfilled by at least the threshold amount for a period of time that is greater than or equal to the second time-to-trigger value.

Example 30. The method of example 28, comprising: detecting, by the user device, a cell identity of a neighbor cell; wherein the transmitting comprises: transmitting, by the user device, the measurement report based on the second time-to-trigger value if a first measurement by the user device of a signal from the neighbor cell after the detecting results in the entry condition of the measurement reporting event for the neighbor cell being over-fulfilled by at least the threshold amount for a period of time that is greater than or equal to the second time-to-trigger value.

Example 31. The method of example 28, comprising: detecting, by the user device, a cell identity of a neighbor cell; wherein the transmitting comprises: transmitting, by the user device, the measurement report based on the second time-to-trigger value if a measurement by the user device of a signal from the neighbor cell within a threshold period of time after the detecting results in the entry condition of the measurement reporting event for the neighbor cell being over-fulfilled by at least the threshold amount for a period of time that is greater than or equal to the second time-to-trigger value.

Example 32. The method of any of examples 28-31, wherein the detecting a cell identity of a neighbor cell comprises: detecting a physical cell identity (PCI) of the neighbor cell as part of a cell search.

Example 33. The method of any of examples 28-32, comprising: receiving, by the user device from a serving cell, configuration information including information indicating at least a requirement or a minimum signal level of the measurement of the signal from the neighbor cell for the entry condition of the measurement reporting event to be over-fulfilled.

Example 34. The method of any of examples 28-32, wherein the determining a first time-to-trigger value and a second time-to-trigger value comprises: receiving, by the user device from a serving cell, configuration information including information indicating at least the second time-to-trigger value or a plurality of second time-to-trigger values.

Example 35. An apparatus comprising means for performing the method of any of examples 28-34.

Example 36. A computer program comprising instructions which, when the program is executed by a computer, cause the computer to carry out the method of any of examples 28-34.

Example 37. An apparatus comprising: at least one processor; and at least one memory including computer program code; the at least one memory and the computer program code configured to, with the at least one processor, cause the apparatus at least to perform the method of any of examples 28-34.

Example 38. A method comprising: sending, by a network node to a user device, configuration information indicating at least one of a first time-to-trigger value and a second time-to-trigger value, wherein the second time-to-trigger value is shorter than the first time-to-trigger value; receiving, by the network node from the user device, a measurement report based on the second time-to-trigger value if either: 1) a first measurement of a signal received by the user device from a neighbor cell after a detecting by the user device of a cell identity of the neighbor cell fulfills an entry condition of the measurement reporting event, or 2) a measurement of a signal from the neighbor cell, within a threshold period of time after the detecting of the cell identity, at least fulfills the entry condition of the measurement reporting event; and otherwise, receiving, by the network node from the user device, a measurement report based on the first time-to-trigger value.

Example 39. A method comprising: sending, by a network node to a user device, configuration information indicating at least one of a first time-to-trigger value and a second time-to-trigger value, wherein the second time-to-trigger value is shorter than the first time-to-trigger value; receiving, by the network node from the user device, a measurement report based on the second time-to-trigger value if a measurement of a signal by the user device from the neighbor cell results in an entry condition of a measurement reporting event for the neighbor cell being over-fulfilled by at least a threshold amount; and otherwise, receiving, by the network node from the user device, a measurement report based on the first time-to-trigger value.

Example 40. The method of example 39, comprising: sending, by the network node to the user device, configuration information including information indicating at least a requirement or a minimum signal level of the measurement of the signal from the neighbor cell for the entry condition of the measurement reporting event to be over-fulfilled.

Example 41. The method of any of examples 38-40, wherein the sending comprises at least: sending, by the network node to the user device, a measurement configuration including at least information or one or more parameters that indicates, or may be used by the user device to determine, the second time-to-trigger (TTT) value.

Example 42. An apparatus comprising means for performing the method of any of examples 38-41.

Example 43. A computer program comprising instructions which, when the program is executed by a computer, cause the computer to carry out the method of any of examples 38-41.

Example 44. An apparatus comprising: at least one processor; and at least one memory including computer program code; the at least one memory and the computer program code configured to, with the at least one processor, cause the apparatus at least to perform the method of any of examples 38-41.

Figure 12:
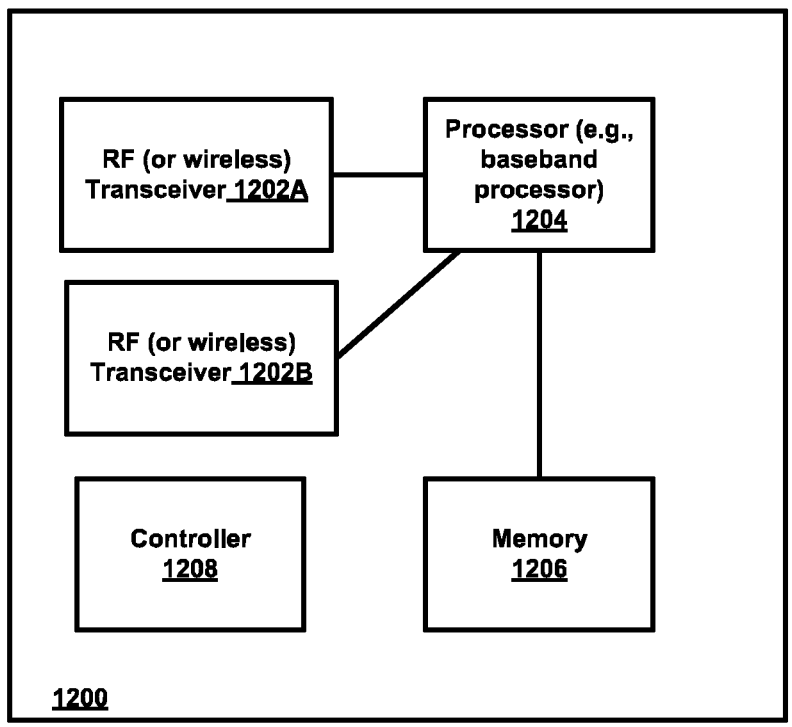
FIG. 12 is a block diagram of a wireless station, network node or wireless node (e.g., AP, BS, RAN node, UE or user device, or other wireless node or network node) according to an example embodiment.

FIG. 12 is a block diagram of a wireless station (e.g., AP, BS or user device/UE, or another network node) 1200 according to an example embodiment. The wireless station 1200 may include, for example, one or more (e.g., two as shown) RF (radio frequency) or wireless transceivers 1202A, 1202B, where each wireless transceiver includes a transmitter to transmit signals and a receiver to receive signals. The wireless station also includes a processor or control unit/entity (controller) 1204 to execute instructions or software and control transmission and receptions of signals, and a memory 1206 to store data and/or instructions.

Processor 1204 may also make decisions or determinations, generate frames, packets or messages for transmission, decode received frames or messages for further processing, and other tasks or functions described herein. Processor 1204, which may be a baseband processor, for example, may generate messages, packets, frames or other signals for transmission via wireless transceiver 1202 (1202A or 1202B). Processor 1204 may control transmission of signals or messages over a wireless network, and may control the reception of signals or messages, etc., via a wireless network (e.g., after being down-converted by wireless transceiver 1202, for example). Processor 1204 may be programmable and capable of executing software or other instructions stored in memory or on other computer media to perform the various tasks and functions described above, such as one or more of the tasks or methods described above. Processor 1204 may be (or may include), for example, hardware, programmable logic, a programmable processor that executes software or firmware, and/or any combination of these. Using other terminology, processor 1204 and transceiver 1202 together may be considered as a wireless transmitter/receiver system, for example.

In addition, referring to FIG. 12, a controller (or processor) 1208 may execute software and instructions, and may provide overall control for the station 1200, and may provide control for other systems not shown in FIG. 12, such as controlling input/output devices (e.g., display, keypad), and/or may execute software for one or more applications that may be provided on wireless station 1200, such as, for example, an email program, audio/video applications, a word processor, a Voice over IP application, or other application or software.

In addition, a storage medium may be provided that includes stored instructions, which when executed by a controller or processor may result in the processor 1204, or other controller or processor, performing one or more of the functions or tasks described above.

According to another example embodiment, RF or wireless transceiver(s) 1202A/1202B may receive signals or data and/or transmit or send signals or data. Processor 1204 (and possibly transceivers 1202A/1202B) may control the RF or wireless transceiver 1202A or 1202B to receive, send, broadcast or transmit signals or data.

The embodiments are not, however, restricted to the system that is given as an example, but a person skilled in the art may apply the solution to other communication systems. Another example of a suitable communications system is the 5G system. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IoT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A user device comprising:
at least one processor; and
at least one memory including computer program code;
the at least one memory and the computer program code configured to, with the at least one processor, cause the user device at least to perform:
determining a first time-to-trigger value and a second time-to-trigger value, wherein the second time-to-trigger value is shorter than the first time-to-trigger value,
wherein the second time-to-trigger value comprises a plurality of second time-to-trigger values that are less than the first time-to-trigger value and greater than or equal to zero,
wherein the determining the first time-to-trigger value and the second time-to-trigger value comprises:
receiving, from a serving cell, configuration information including information indicating the second time-to-trigger value or the plurality of second time-to-trigger values,
wherein the determining the second time-to-trigger value comprises:
receiving, from the serving cell, a measurement configuration including at least information or one or more parameters that indicates, or may be used to determine, the second time-to-trigger value,
determining the second time-to-trigger value of zero if an entry condition of a measurement reporting event for a neighbor cell is over-fulfilled by a threshold amount, and
determining the second time-to-trigger value based on amount of over-fulfillment of the entry condition;
detecting a cell identity of the neighbor cell, wherein detecting the cell identity of the neighbor cell comprises detecting a physical cell identity (PCI) of the neighbor cell as part of a cell search;
determining a first measurement of a signal from the neighbor cell, wherein the determining comprises determining that the first measurement by the user device fulfills the entry condition of the measurement reporting event for the neighbor cell;
determining a subsequent measurement, within a threshold period of time after the detecting, of a signal from the neighbor cell;
receiving, from the serving cell, configuration information including information indicating at least a requirement or a minimum signal level of at least one of the first measurement or the subsequent measurement of the signal received from the neighbor cell for the entry condition of the measurement reporting event to be over-fulfilled;
determining whether either the first measurement of a signal from the neighbor cell after the detecting or the subsequent measurement of a signal from the neighbor cell within the threshold period of time after the detecting, at least fulfills the entry condition of the measurement reporting event for the neighbor cell, wherein the determining comprises determining that at least one of the first measurement or the subsequent measurement of the signal from the neighbor cell results in the entry condition of the measurement reporting event being over-fulfilled in which the subsequent measurement of the signal of the neighbor cell exceeds a requirement of the entry condition of the measurement reporting event;
selecting one of the plurality of second time-to-trigger values based on an amount that the measurement reporting event is over-fulfilled;
transmitting to the serving cell a measurement report based on the second time-to-trigger value if either the first measurement of a signal from the neighbor cell after the detecting or the subsequent measurement of a signal from the neighbor cell within the threshold period of time after the detecting fulfills the entry condition of the measurement reporting event, wherein the transmitting comprises transmitting the measurement report in response to the entry condition being fulfilled at least for a period of time equal to the second time-to-trigger value, wherein the transmitting a measurement report based on the second time-to-trigger value is performed based on the entry condition of the measurement reporting event being over-fulfilled, wherein the transmitting is further based on the selected second time-to-trigger value of the plurality of second time-to-trigger values; and otherwise, transmitting a measurement report based on the first time-to-trigger value.

\* \* \* \* \*